(12) United States Patent
Ho

(10) Patent No.: US 6,776,002 B1
(45) Date of Patent: Aug. 17, 2004

(54) MAGNETICALLY COUPLED INTEGRATED POWER AND COOLING UNIT

(75) Inventor: Yu-Hang Ho, Torrance, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 10/423,327

(22) Filed: Apr. 25, 2003

(51) Int. Cl.$^7$ ............................................. F25D 9/00
(52) U.S. Cl. ...................................................... 62/401
(58) Field of Search ............................ 62/86, 87, 172, 62/236, 401, 402, 331

(56) References Cited

U.S. PATENT DOCUMENTS

| | | | |
|---|---|---|---|
| 3,194,026 A | 7/1965 | La Fleur | |
| 4,277,707 A | 7/1981 | Silver et al. | |
| 4,419,926 A | 12/1983 | Cronin et al. | |
| 4,462,561 A | 7/1984 | Cronin | |
| 4,494,372 A | 1/1985 | Cronin | |
| 4,503,666 A | * 3/1985 | Christoff | .................... 60/39.07 |
| 4,514,976 A | 5/1985 | Christoff | |
| 4,546,939 A | 10/1985 | Cronin | |
| 4,684,081 A | 8/1987 | Cronin | |
| 5,309,029 A | 5/1994 | Gregory et al. | |
| 5,442,905 A | 8/1995 | Claeys et al. | |
| 5,490,645 A | 2/1996 | Woodhouse | |
| 5,709,103 A | 1/1998 | Williams | |
| 5,813,630 A | 9/1998 | Williams | |
| 5,899,085 A | 5/1999 | Williams | |
| 5,911,388 A | 6/1999 | Severson et al. | |
| 5,956,960 A | 9/1999 | Niggeman | |
| 6,101,806 A | 8/2000 | Chen et al. | |
| 6,127,758 A | 10/2000 | Murry et al. | |
| 6,283,410 B1 | 9/2001 | Thompson | |
| 6,305,156 B1 | 10/2001 | Lui | |
| 6,316,841 B1 | 11/2001 | Weber | |
| 6,417,578 B1 | 7/2002 | Chapman et al. | |
| 6,527,228 B2 | * 3/2003 | Mitani | ..................... 244/118.5 |
| 2002/0113167 A1 | 8/2002 | Albero et al. | |
| 2002/0162914 A1 | 11/2002 | Albero et al. | |

FOREIGN PATENT DOCUMENTS

| | | |
|---|---|---|
| GB | 2076897 A | 12/1981 |
| GB | 2127492 A | 4/1984 |

* cited by examiner

Primary Examiner—Henry Bennett
Assistant Examiner—Malik N. Drake
(74) Attorney, Agent, or Firm—Robert P Lenart, Esq.; Pietragallo, Bosick & Gordon

(57) ABSTRACT

An apparatus for providing environmental control, secondary power and emergency power for an aircraft, comprises a cooling turbine coupled to a first electromechanical machine rotor, and including an input for receiving compressed air or ram air, and an output for discharging cooled air or exhaust air; a compressor coupled to a second electromechanical machine rotor, and including an input for receiving engine bleed air or ambient air, and an output for discharging compressed air; means for magnetically coupling the first and second rotors; a power turbine coupled to the compressor; a heat exchanger connected between the compressor output and the cooling turbine input; and a control unit for controlling the magnetic coupling between the first and second rotors.

20 Claims, 2 Drawing Sheets

MAGNETICALLY COUPLED INTEGRATED POWER AND COOLING UNIT

FIELD OF THE INVENTION

This invention relates to aircraft environmental control systems and power systems, and more particularly to integrated environmental control, secondary power and emergency power systems.

BACKGROUND OF THE INVENTION

Current integrated aircraft environmental control, secondary power and emergency power systems connect a compressor, power turbine and expansion turbine together using a single solid shaft. A single starter/generator is mounted on the same shaft. This arrangement forces all of the turbo-machine elements to rotate at the same speed. It is difficult to design all elements to operate at maximum efficiency at the same speed, since the power within the system must sum to zero and thus be balanced.

When applying thermal management considerations to the current system design, that design has limited operability due to surge margin and other inherent design limitations of the individual turbo-machine elements. The use of multiple elements on a single shaft results in a narrow operating window and margin. In addition, a long shaft is required to mount all of the turbo-machine elements. Furthermore, the use of a starter/generator requires a lower critical speed, and thus prevents operation at higher speeds. Current systems also use an air storage bottle to provide stored energy for high altitude emergency operation.

Ram air turbines and stored energy devices such as air bottles and hydrazine powered emergency power units (EPU) have been used as stand-alone emergency power devices. However, such systems are inoperative most of the time and contribute to increased aircraft weight and volume.

There is a need for an integrated apparatus that can provide environmental control, secondary power and emergency power.

SUMMARY OF THE INVENTION

This invention provides an apparatus for providing environmental control, secondary power and emergency power for an aircraft. The apparatus comprises a cooling turbine coupled to a first electromechanical machine rotor, and including an input for receiving compressed air or ram air, and an output for discharging cooled air or exhaust air; a compressor coupled to a second electromechanical machine rotor, and including an input for receiving engine bleed air or ambient air, and an output for discharging compressed air; means for magnetically coupling the first and second rotors; a power turbine coupled to the compressor; a heat exchanger connected between the compressor output and the cooling turbine input; and a control unit for controlling the magnetic coupling between the first and second rotors.

The means for magnetically coupling the first and second rotors can comprise a first stator winding magnetically coupled to the first rotor and a second stator winding magnetically coupled to the second rotor, and the control unit can comprise means for electrically connecting the first and second stator windings to each other. The control unit can connect voltage and/or current between the first and second stator windings using pulse code modulation.

The apparatus can further comprise a third stator winding and means for connecting the second stator winding and the third stator winding to a power source. A second control unit can be provided for driving the second rotor and the second stator as a motor. The first rotor, the second rotor, the first stator winding, the second stator winding and the third stator winding can be components of a switched reluctance machine.

DETAILED DESCRIPTION OF THE INVENTION

Figure 1:
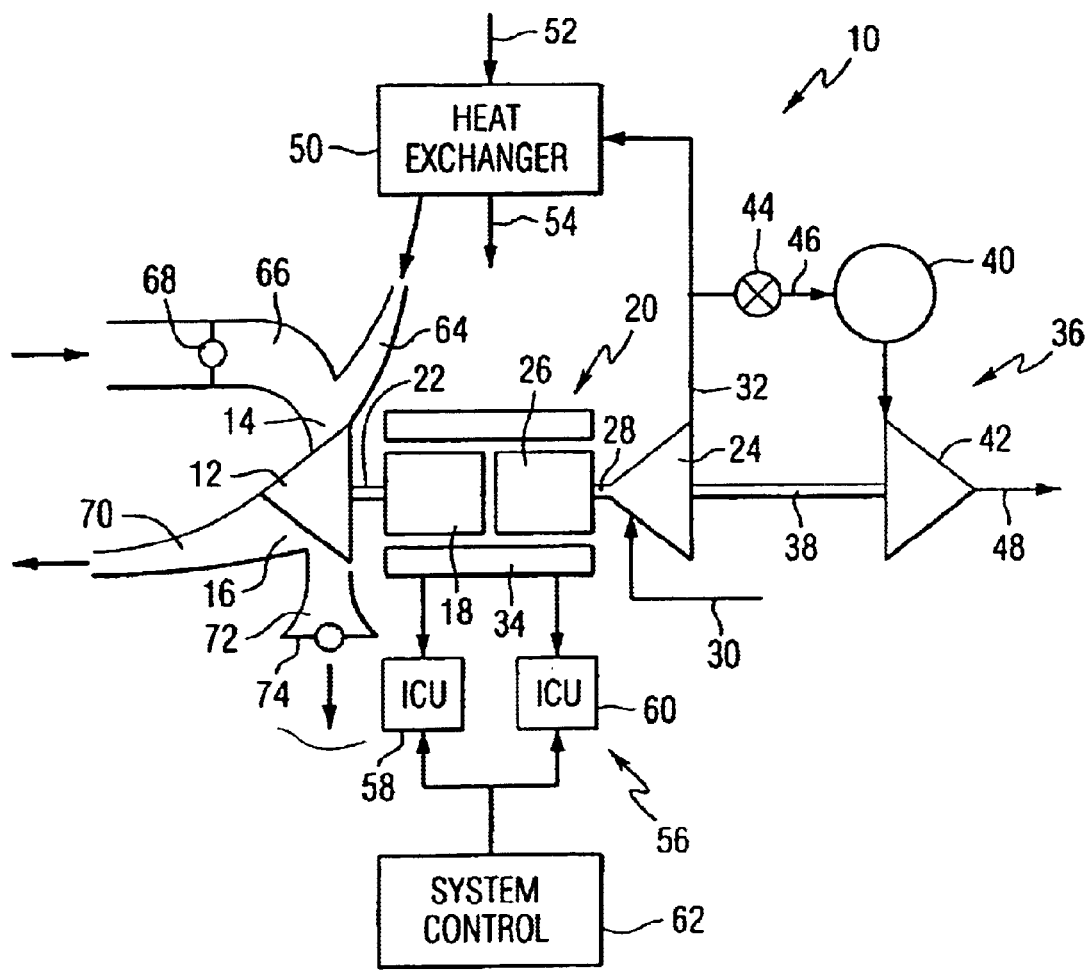
FIG. 1 is a schematic representation of an integrated environmental control, secondary power and emergency power system constructed in accordance with this invention.

Referring to the drawings, FIG. 1 is a schematic representation of an integrated environmental control, secondary power and emergency power system 10 constructed in accordance with this invention. The system includes an expansion, or cooling, turbine 12 having an input 14 for receiving compressed air or ram air, and an output 16 for discharging cooled air or exhaust air. The cooling turbine 12 is coupled to a first rotor 18 of an electromechanical machine 20 by a first shaft 22. A compressor 24 is coupled to a second rotor 26 of the electromechanical machine 20 by a shaft 28, and includes an input 30 for receiving engine bleed air or ambient air, and an output 32 for discharging compressed air. The electromechanical machine 20 includes a stator 34 that magnetically couples the first and second rotors to each other. It can be operated as a motor or generator depending upon the desired operating mode of the system, and is sometimes referred to as a motor/generator or a starter generator.

A power turbine 36 is coupled to the compressor by shaft 38, which could be the same shaft as shaft 28. The power turbine includes a combustion chamber 40 and a turbine section 42. A valve 44 connects the output of the compressor to an input 46 of the power turbine. The turbine section is provided with an exhaust port 48.

A heat exchanger 50 is coupled to the compressor output and the cooling turbine input. The heat exchanger can be an air/fuel heat exchanger with fuel passing though the heat exchanger as illustrated by arrows 52 and 54. A control unit 56, which can include integrated control units 58 and 60, receives input signals from an aircraft system control 62 and controls the magnetic coupling between the first and second rotors.

The input of the expansion cooling turbine is connected to a first duct 64 for receiving high pressure cooled air from the heat exchanger and a second duct 66 for receiving ram air. A valve 68 serves as means for opening or closing the ram air duct. The output of the expansion cooling turbine is connected to a first duct. 70 for discharging low pressure cooled air and a second duct 72 for discharging ram air. A valve 74 serves as means for opening or closing the ram air discharge duct. Cooled air discharged from the cooling turbine can be delivered to the aircraft cabin or avionics. Valves 68 and 74 can be controlled to open or close to accommodate the various operating modes of the system discussed below.

While the first and second rotors and the stator are illustrated in FIG. 1 as a single electromagnetic machine, it should be understood that the two electromagnetic machines could be used with the first rotor being magnetically coupled to a first stator and the second rotor being magnetically coupled to a second stator. The stators would be controlled by the illustrated control units.

Mounting dual rotors in an in-line configuration has the benefit of constructing a compact package. The cooling arrangement for the electromechanical machine can be simpler and electromagnetic shielding can be more efficient. Rotors 18 and 26 are magnetically coupled by direct electrical power transfer using electronic switching by the integrated control unit. The differential power required by the system can be received from the aircraft power system to drive the rotor 26 of the electromechanical machine. The system control can modulate the power differential between the cooling turbine 12 and the compressor 24. In one embodiment of the invention, the electromechanical machine rotor 26 acts as a motor with dual windings. One winding allows the direct electrical power transfer from rotor 18 and another one accepts power from the aircraft electrical power system during normal cooling modes.

The electromechanical machine component of the system can be embodied in separate machines to accommodate installation requirements such as ram air circuit. However, such arrangement may require the 58 and 60 ICUs to be heavier in order to handle the higher power transfer and the ICUs may have higher losses due to the electronic power switching required to manage the power. Nevertheless, it remains to be a viable configuration.

This invention combines the features of a ram air turbine, electrical starter/generator and turbo-machine into a Magnetically Coupled Integrated Power and Cooling Unit (MCIPCU). The MCIPCU electrically links the cooling turbine and an auxiliary power section. The cooling turbine is designed for dual mode operation. It acts as a cooling turbine to expand cooled compressed air to generate cooling air in the normal cooling mode. In the event of an emergency, a ram air scoop is opened to allow power generation. During normal cooling mode operation, a minimum amount of engine bleed air would be fed through the power turbine section to minimize the turbine drag. The system can also operate with electrical power input from the power generated from a main engine starter/generator. In one embodiment, the amount of differential power input required would be around 250 Hp for 50–60 kW of cooling loads. In that embodiment, the cooling turbine would generate approximately 150 Hp and the compressor would require 400 Hp to compress the working media.

In the system of FIG. 1, the expansion cooling turbine is coupled with the other elements through a first rotor of an electromagnetic machine in the form of a split motor/generator. The compressor and power turbine are coupled to the second rotor of the motor/generator. These two rotors are linked by magnetic coupling.

The electromagnetic machine can provide both electrical power generation and motoring. This arrangement enables several operating modes. In a ground cooling mode, during ground maintenance, the cooling turbine can be motored by applying external electrical power to the electromechanical machine to circulate air through the system and provide partial cooling. In the event that cold air is required, the compressor can also be driven electrically to provide compressed air. The compressed air can be cooled by ground cooling air and fed into the cooling turbine. The cooling turbine would then expand the compressed air and produce cold air for avionics and crew cooling.

In a starting mode, the compressor can be motored by the starter/generator on the compressor side to compress the ambient air. The resulting compressed air can be mixed with fuel in the combustion chamber to produce high-pressure, high-temperature gas. The hot gas propels the power turbine to generate power and in turn feeds back power to the compressor through the common shaft. Since the expansion cooling turbine can be decoupled from compressor and power turbine, it does not contribute unwanted drag during this operating mode and allows more efficient operation.

In an auxiliary power mode, after the power turbine is started, the compressor sucks in ambient air and feeds compressed air into the combustor. Fuel is mixed with the high pressure air and combusted in the combustor to generate high temperature and high pressure air to drive the power turbine. Electrical power is generated from the starter/generator and is used by the aircraft. The amount of power generated is subject to the lapse-rate characteristic and the air density reduction. The lapse-rate characteristic is the theoretical rate of decrease of temperature with increasing height in the atmosphere.

In a normal cooling mode, the compressor compresses engine bleed air or ambient air and feeds the inter-cooling heat exchanger. The inter-cooling heat exchanger can be cooled either by ambient air or engine fuel. After cooling, the high pressure and cooled air is expanded in the cooling turbine to generate cold air for avionics and crew cooling needs. Partial compressed air from the compressor can be routed through the power turbine to minimize drag. The power required to drive the compressor can be provided partly by the power generated by the cooling turbine fed back through the starter/generator with any additional required power being provided by the aircraft electrical system.

In the event of an engine mounted generator out condition, the system can operate in an emergency power mode by using engine bleed air at high altitude instead of sucking ambient air, and can run in the auxiliary power mode to generate electrical power thus providing electrical power system redundancy. Since the system is boosted by engine bleed air, it can operate at high altitude.

In the event of an engine out condition, the system can operate in an emergency power mode wherein the cooling turbine operates as a ram air turbine by opening the ram air scoop. Power generated from the motor/generator in a generating mode would sustain the power requirements of the aircraft until it descends to an altitude where the auxiliary power mode can be established.

Figure 2:
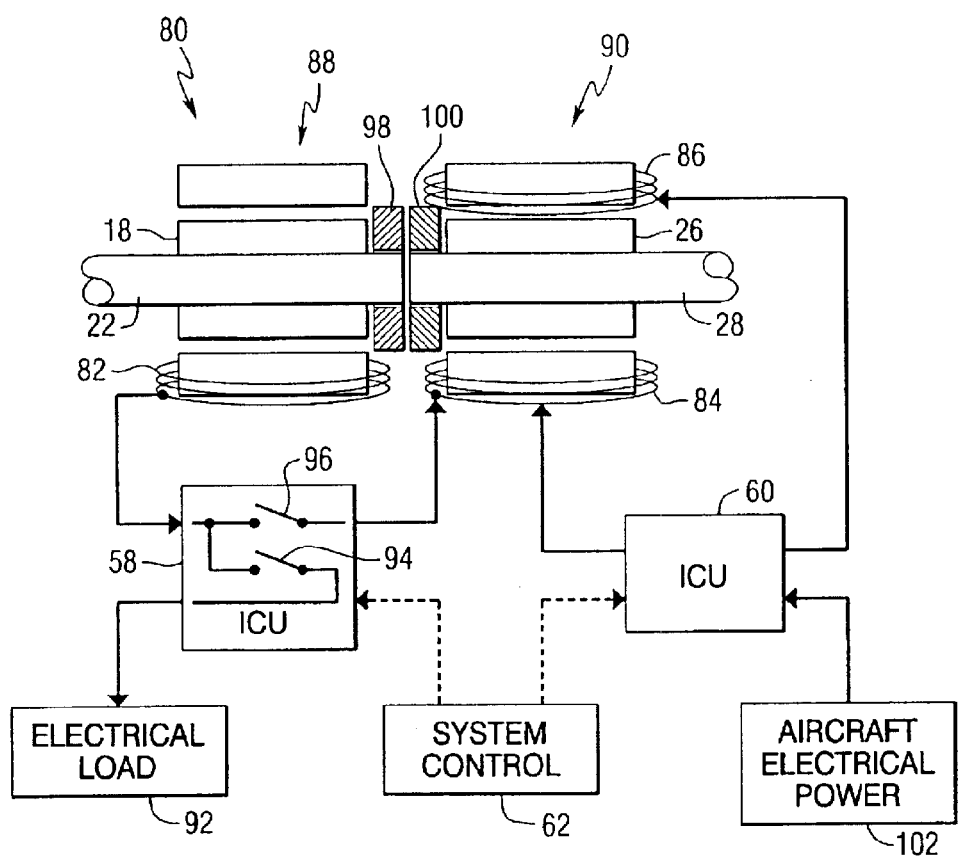
FIG. 2 is a schematic representation of an electromagnetic machine and associated controls that can be used in systems constructed in accordance with this invention.

FIG. 2 is a schematic representation of an electromagnetic machine and associated components that can be used in systems constructed in accordance with this invention. Items in FIG. 2 that correspond to items in FIG. 1 have corresponding item numbers.

In the system of FIG. 2, the magnetic coupling between the shafts 22 and 28 is provided by a permanent magnet electromechanical machine 80. The electromechanical machine includes rotors 18 and 26 mounted for relative movement with respect to stator windings 82, 84 and 86. Stator winding 82 can be mounted in a first stator 88, and stator windings 84 and 86 can be mounted in a second stator 90. The mechanical energy input on shaft 22 is converted to electrical energy by relative movement between the permanent magnet rotor 18 and stator winding 82, to generate voltage in the stator winding 82. Integrated control unit (ICU) 58 can connect the winding 82 to the aircraft power system as illustrated by an external load 92 through a connection means illustrated as switch 94, or to winding 84 by a connection means illustrated as switch 96. The system control 62 contains the control logic and performs all system management and communications. The ends of the shafts 22 and 28 can be supported by bearing 98 and 100, respectively.

The electromechanical machine is coupled to the ram-air/cooling turbine by the shaft 22, and the compressor by the shaft 28. The winding 82 is switched by ICU 58 to transfer electric power to winding 84 in the cooling mode. Aircraft power, as illustrated by block 102, is used to add power using winding 86 through ICU 60. The system power balance is controlled by regulating the amount of power input to the winding 86. This action directly changes the power received by the compressor and changes the system operating point. The integrated control units 58 and 60 can control the voltage and current by means of pulse width modulation (PWM).

In the emergency mode, the power extracted from the ram-air/cooling turbine is converted into electrical power by rotor 18 and winding 82, and is switched by the ICU 58 for aircraft use instead of feeding into winding 84. Electronic switch 96 in ICU 58 is open and switch 94 is closed to output power to the aircraft. When the appropriate altitude is reached, the APU side of rotor 26, compressor 24, and power turbine 42 will function using combustor 40 to breath in air and burn fuel to generate power. During ground start of the integrated power and cooling unit, the ICU 60 excites both winding 84 and winding 86 to drive the rotor 26.

This system eliminates the need for a high-pressure stored air bottle, and additional re-charge compressor, and any associated lines and cooling components. It also eliminates the technical challenges of icing conditions during discharging of high-pressure air as in systems of the prior art. The ram air emergency power generation replaces the emergency power function provided by the stored air system.

The invention provides for power matching between turbo-machine elements. Systems constructed in accordance with this invention also provide reduced turbo-machine cost and weight compared with a single shaft design.

While the invention has been described in terms of specific examples, it should be understood that various changes can be made to the disclosed examples without departing from the scope of the invention as defined by the following claims.

What is claimed is:

1. An apparatus for providing environmental control, secondary power and emergency power for an aircraft, the apparatus comprising:
    a cooling turbine coupled to a first electromechanical machine rotor, and including an input for receiving compressed air or ram air, and an output for discharging cooled air or exhaust air;
    a compressor coupled to a second electromechanical machine rotor, and including an input for receiving engine bleed air or ambient air, and an output for discharging compressed air;
    means for magnetically coupling the first and second rotors;
    a power turbine coupled to the compressor;
    a heat exchanger connected between the compressor output and the cooling turbine input; and
    a first control unit for controlling the magnetic coupling between the first and second rotors.

2. The apparatus of claim 1, wherein the means for magnetically coupling the first and second rotors comprises a first stator winding magnetically coupled to the first rotor and a second stator winding magnetically coupled to the second rotor, and wherein the first control unit comprises means for electrically connecting the first and second stator windings to each other.

3. The apparatus of claim 2, wherein the first control unit connects the first and second stator windings using pulse code modulation.

4. The apparatus of claim 2, further comprising:
    a third stator winding; and
    means for connecting the third stator winding to a power source.

5. The apparatus of claim 4, wherein the means for connecting the third stator winding to a power source comprises:
    a second control unit for driving the second rotor and the second stator as a motor.

6. The apparatus of claim 4, wherein the first rotor, the second rotor, the first stator winding, the second stator winding and the third stator winding are components of a switched reluctance machine.

7. The apparatus of claim 1, further comprising:
    means for connecting the input to the cooling turbine to a ram air input.

8. The apparatus of claim 1, wherein the power turbine comprises:
    a combustion chamber; and
    means for connecting the combustion chamber to the output of the compressor.

9. The apparatus of claim 1, further comprising:
    means for connecting the output of the cooling turbine to an exhaust.

10. The apparatus of claim 1, wherein:
    the cooling turbine is connected to the first electromechanical machine rotor by a first shaft; and
    the compressor is connected to the second electromechanical machine rotor by a second shaft.

11. The apparatus of claim 10, wherein the power turbine is connected to the second shaft.

12. An apparatus for providing environmental control, secondary power and emergency power for an aircraft, the apparatus comprising:
    a cooling turbine coupled to a first electromechanical machine rotor, and including an input for receiving compressed air or ram air, and an output for discharging cooled air or exhaust air;
    a compressor coupled to a second electromechanical machine rotor, and including an input for receiving engine bleed air or ambient air, and an output for discharging compressed air;
    a stator for magnetically coupling the first and second rotors;
    a power turbine coupled to the compressor;
    a heat exchanger connected between the compressor output and the cooling turbine input; and
    a first control unit for controlling the magnetic coupling between the first and second rotors.

13. The apparatus of claim 12, wherein the stator comprises a first stator winding magnetically coupled to the first rotor and a second stator winding magnetically coupled to the second rotor, and wherein the first control unit electrically connects the first and second stator windings to each other.

14. The apparatus of claim 13, wherein the first control unit connects the first and second stator windings using pulse code modulation.

15. The apparatus of claim 13, further comprising:
a third stator winding; and
a second control unit for connecting the third stator winding to a power source and for driving the second rotor and the second stator as a motor.

16. The apparatus of claim 15, wherein the first rotor, the second rotor, the first stator winding, the second stator winding and the third stator winding are components of a switched reluctance machine.

17. The apparatus of claim 12, wherein the power turbine comprises:
a combustion chamber, and
wherein the output of the compressor is connected to the combustion chamber.

18. The apparatus of claim 12, further comprising:
an exhaust connected to the output of the cooling turbine.

19. The apparatus of claim 12, wherein:
the cooling turbine is connected to the first electromechanical machine rotor by a first shaft; and
the compressor is connected to the second electromechanical machine rotor by a second shaft.

20. The apparatus of claim 19, wherein the power turbine is connected to the second shaft.

* * * * *

UNITED STATES PATENT AND TRADEMARK OFFICE
CERTIFICATE OF CORRECTION

PATENT NO. : 6,776,002 B1 Page 1 of 1
APPLICATION NO. : 10/423327
DATED : August 17, 2004
INVENTOR(S) : Yu-Hang Ho It is certified that error appears in the above-identified patent and that said Letters Patent is hereby corrected as shown below:

Title page
(74)Attorney, Agent, or Firm
"Robert P Lenart, Esq." should read -- Robert P. Lenart, Esq. --

Column 2, Line 57
After "duct" delete " . "

Column 5, line 24
After "and", "bum" should read -- burn --

Column 7, Line 12 (Claim 17)
After "chamber" change " , " to -- ; --

Signed and Sealed this

Fourth Day of July, 2006

JON W. DUDAS
*Director of the United States Patent and Trademark Office*